United States Patent
Bossen et al.

(10) Patent No.: US 6,223,299 B1
(45) Date of Patent: Apr. 24, 2001

(54) ENHANCED ERROR HANDLING FOR I/O LOAD/STORE OPERATIONS TO A PCI DEVICE VIA BAD PARITY OR ZERO BYTE ENABLES

(75) Inventors: Douglas Craig Bossen, Austin; Charles Andrew McLaughlin; Danny Marvin Neal, both of Round Rock; James Otto Nicholson; Steven Mark Thurber, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/072,418

(22) Filed: May 4, 1998

(51) Int. Cl.$^7$ ................................................ G06F 11/00
(52) U.S. Cl. .................... 714/5; 714/6; 714/7; 714/8; 714/53; 714/54; 714/723; 714/42; 714/43; 714/44; 714/56
(58) Field of Search .................. 714/5, 53, 54, 714/723, 6, 7, 8, 42, 43, 44, 56; 395/308; 710/128

(56) References Cited

U.S. PATENT DOCUMENTS

| | | | |
|---|---|---|---|
| 5,313,627 | * | 5/1994 | Amini et al. ................ 395/575 |
| 5,404,483 | * | 4/1995 | Stamm et al. ................ 711/44 |
| 5,499,346 | * | 3/1996 | Amini et al. ................ 395/308 |
| 5,581,714 | * | 12/1996 | Amini et al. ................ 395/308 |
| 5,790,831 | * | 8/1998 | Lin et al. ................ 710/101 |
| 5,815,647 | * | 9/1998 | Buckland et al. ............ 395/182.01 |
| 5,857,080 | * | 1/1999 | Jander et al. ................ 395/307 |
| 5,857,085 | * | 1/1999 | Zhang et al. ................ 395/309 |
| 5,859,988 | * | 1/1999 | Ajanovic et al. ............ 395/309 |
| 5,872,910 | * | 2/1999 | Kuslak et al. ................ 714/41 |

* cited by examiner

Primary Examiner—Ayaz Sheikh
Assistant Examiner—Frantz B. Jean
(74) Attorney, Agent, or Firm—Volel Emile; Felsman, Bradley, Vaden, Gunter & Dillon, LLP

(57) ABSTRACT

Device selects lines from each I/O device are brought into a PCI host bridge individually so that the device number of a failing device may be logged in an error register when an error is seen on the PCI bus. Until the error register is reset, subsequent load and store operations are delayed until the device number of the subject device may be checked against the error register. If the subject device is a previously failing device, the load/store operation to that device is prevented from completing, either by forcing bad parity or zeroing all byte enables. By forcing bad parity of zero byte enables, the I/O device will respond to the load or store request by activating its device select line, but will not accept store data. Operations to devices which are not logged in the error register are permitted to proceed normally, as are all load store operations when the error register is clear. Normal system operations are thus not impacted, and operations during error recovery are permitted to proceed if no further damage will be caused by such operations.

28 Claims, 4 Drawing Sheets

ENHANCED ERROR HANDLING FOR I/O LOAD/STORE OPERATIONS TO A PCI DEVICE VIA BAD PARITY OR ZERO BYTE ENABLES

BACKGROUND OF THE INVENTION

1. Technical Field

The present invention relates in general to bus error handling and in particular to handling bus errors during load and store operations. Still more particularly, the present invention relates to preventing damage from bus errors during load and store operations through forced bad data parity or zero byte enables thereby enhancing the capability of recovering from such errors.

2. Description of the Related Art

Many data processing systems support a standard input/ output (I/O) systems conforming to the peripheral component interconnect (PCI) Local Bus architecture, an architecture supporting many complex features including I/O expansion through PCI-to-PCI bridges, peer-to-peer (device-to-device) data transfers, multi-function devices, and both integrated and plug-in devices. In setting up I/O operations to I/O devices on a PCI bus, the device driver must perform a series of load and/or store operations to the I/O device. If any of these operations gets a parity error on the I/O bus, it is necessary to get this information back to the device driver so that the device driver can stop before the operation is initiated.

As an example, a first store operation may be employed to set up an address in the I/O device, followed by a second store operation signalling the I/O device to begin the data transfer. If the first store operation gets an error and the second store operation is then received, the I/O device might start the operation to the incorrect location. The PCI architecture includes no provision for designing adapters to prevent load and/or store operations from continuing after an error. Most contemporary systems allow device driver execution to continue after a store operation rather than wait for a "successful" response to the store operation to determine if it completely correctly. This is preferable since the processor stall required to wait for a response to store operations would vastly degrade system performance.

One technique allowing the device driver to prevent subsequent load and/or store operations from completing after an error without waiting for the response to every load or store operation is for the device driver to read back all of the setup information before issuing the "go" store operation (the store operation signalling the device driver to begin) and then compare the read back data with the stored data to determine if the two are the same prior to issuing the "go" store operation. However, this requires a lot of processor time for the load operations out to the device, a long path, in many cases, relative to processor instruction times. Another possible solution is to examine bits within the interface or status registers within the I/O device to determine whether an error has occurred after a store operation. This, however, is unsupported by current architectures and also requires a lot of processor time.

Yet another solution is for an I/O device to generate an external interrupt when there is an error after a store operation, but waiting for an interrupt before continuing takes a lot of time. Other conceivable possibilities will generally be adapter dependent, and thus incapable of working with any I/O device not designed for that solution, or will require a lot of processor time.

It would be desirable, therefore, to provide a method and apparatus for preventing load and/or store operations from completing after an error without waiting for a response to every load or store operation. It would also be advantageous for the mechanism to avoid requiring changes to PCI adapter or I/O device hardware, so that the mechanism may be employed with any I/O device, even if not designed specifically for that mechanism.

SUMMARY OF THE INVENTION

It is therefore one object of the present invention to provide a method and apparatus for bus error handling.

It is another object of the present invention to provide a method and apparatus for handling bus errors during load and store operations.

It is yet another object of the present invention to provide a method and apparatus for preventing damage from bus errors during load and store operations through identification of a device which previously encountered an error by use of forced bad data parity or zero byte enables.

The foregoing objects are achieved as is now described. Device selects lines from each I/O device are brought into a PCI host bridge individually so that the device number of a failing device may be logged in an error register when an error is seen on the PCI bus. Until the error register is reset, subsequent load and store operations are delayed until the device number of the subject device may be checked against the error register. If the subject device is a previously failing device, the load/store operation to that device is prevented from completing, either by forcing bad parity or zeroing all byte enables. By forcing bad parity of zero byte enables, the I/O device will respond to the load or store request by activating its device select line, but will not accept store data. Operations to devices which are not logged in the error register are permitted to proceed normally, as are all load store operations when the error register is clear. Normal system operations are thus not impacted, and operations during error recovery are permitted to proceed if no further damage will be caused by such operations.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
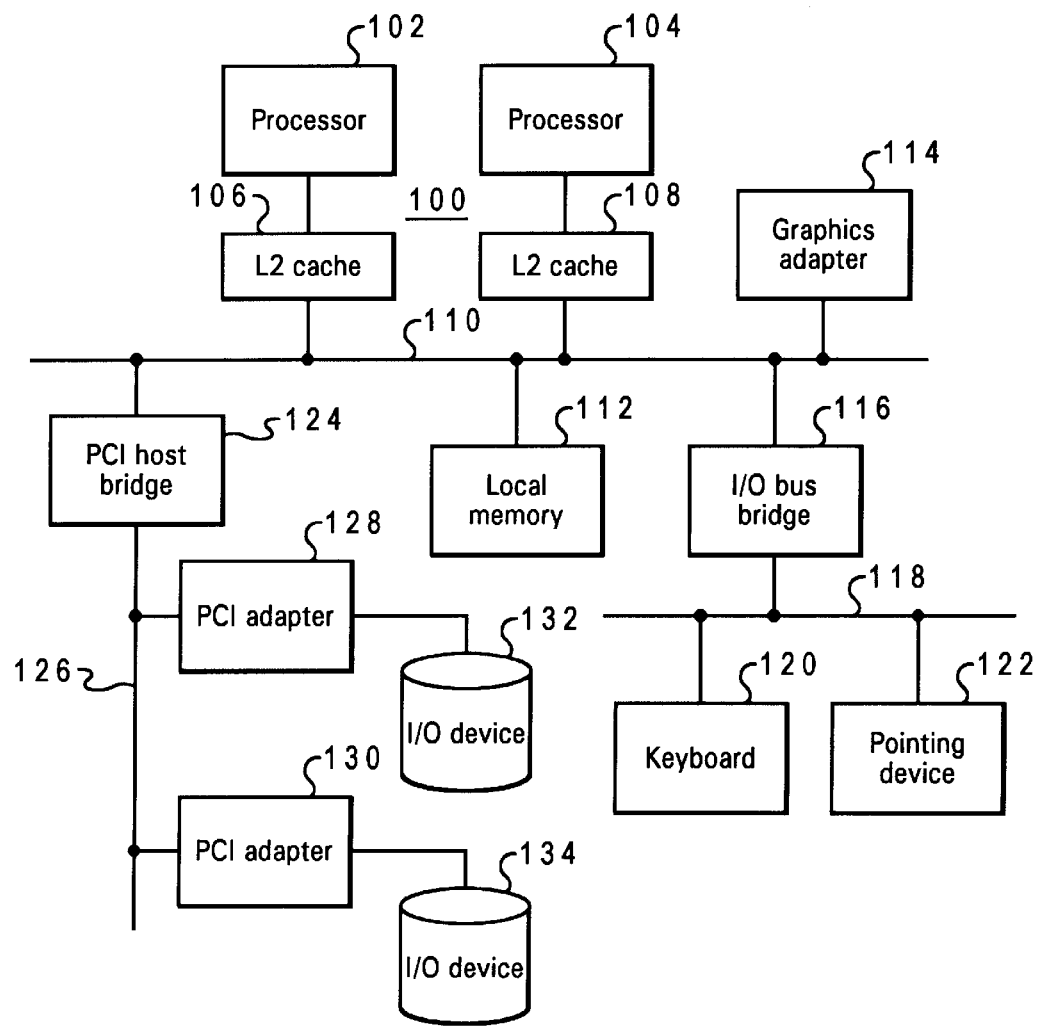
FIG. 1 depicts a block diagram of a data processing system in which a preferred embodiment of the present invention may be implemented.

With reference now to the figures, and in particular with reference to FIG. 1, a data processing system in which a preferred embodiment of the present invention may be implemented is depicted. Data processing system 100 is a symmetric multiprocessor (SMP) system including a plurality of processors 102 and 104, which preferably comprise one of the PowerPC™ family of processors available from International Business Machines of Armonk, New York. Although only two processors are depicted in the exemplary embodiment, a single or additional processors may be utilized. The invention is applicable to other systems besides SMP data processing systems, such as uniprocessor systems, NUMA architecture systems, cluster systems, and the like.

Each processor 102 and 104 has an associated level two (L2) cache 106 and 108, respectively, for staging data and instructions to the processors. Processors 102 and 104 are connected, through L2 caches 106 and 108, to system bus 110. Also connected to system bus 110 is local memory 112, a memory mapped graphics adapter 114 providing a connection for a display (not shown), and an input/output (I/O) bus bridge coupling system bus 110 to I/O bus 118. Input devices such as keyboard 120 and a pointing device 122, which may be a mouse, trackball, or the like, are connected to I/O bus 118.

Also connected to system bus 110 in the present invention is a Peripheral Component Interconnect (PCI) host bridge 124, which couples system bus 110 to PCI bus 126. PCI bus 126 includes a plurality of slots for adapters 128 and 130, connecting nonvolatile storage devices 132 and 134 to PCI bus 126. Nonvolatile storage devices 132 and 134 may be magnetic disk drives, solid state disks, or other conventional storage devices.

The operation of data processing system 100 is known to those in the art. Software contained within storage devices, such as nonvolatile storage devices 132 and 134 or other devices such as a read only memory (ROM), includes an operating system and related routines which are loaded in response to the system being powered on. Such software is loaded into system memory 112 and staged via L2 caches 106 and 108 to processors 102 and 104, as is application software and related data also contained within storage devices 132 and/or 134. Keyboard 120 and pointing device 122 may be employed to control the software applications being executed through a user interface, which may be a graphical user interface.

Those skilled in the art will recognize that data processing system 100 may include many additional components not explicitly shown in FIG. 1, such as serial and parallel ports, connections to networks or attached devices, a controller regulating access to system bus 110 and/or system memory 112, etc. In addition, other system architecture structures, such as NUMA or cluster structures, may be employed in conjunction with the present invention. Such modifications and variations are within the spirit and scope of the present invention.

Figure 2:
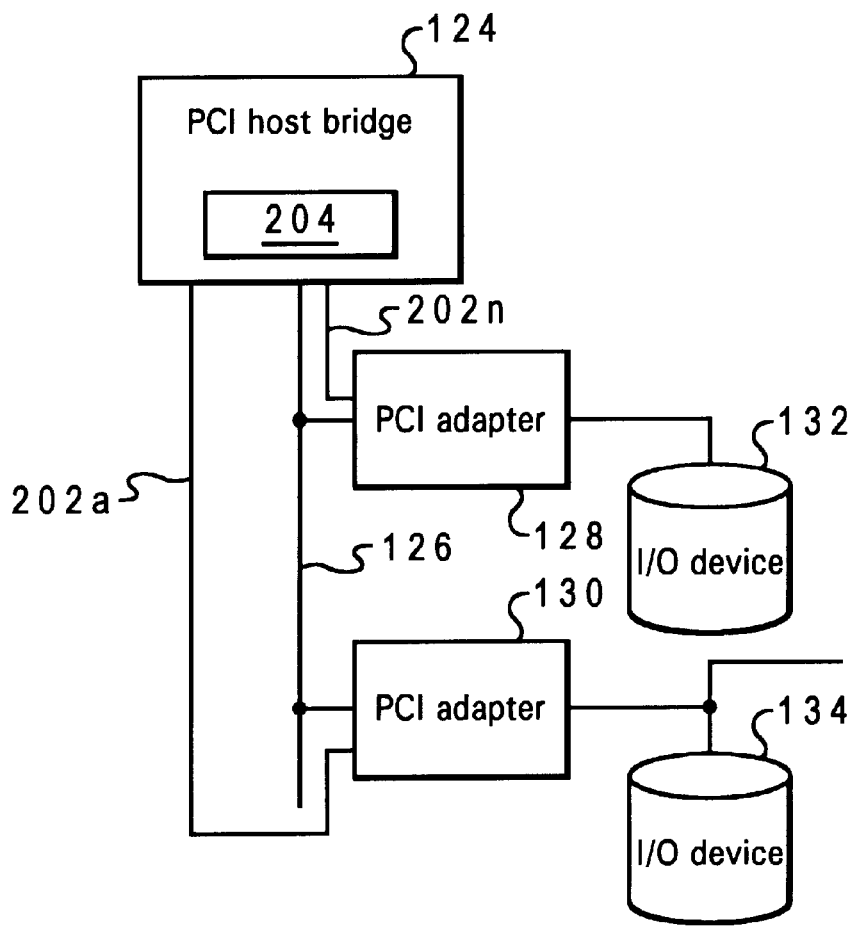
FIG. 2 is a diagram of a peripheral component interconnect host bridge in accordance with a preferred embodiment of the present invention.

Referring to FIG. 2, a diagram of a peripheral component interconnect host bridge in accordance with a preferred embodiment of the present invention is illustrated. In developing a solution to the problem of preventing loads and stores from completing after an error, one key to getting around the limitations described earlier is to delay reporting of any error until the device driver needs to perform a load from the device for some other reason. At that time, the previous error may be reported. In order for this to be successful, however, there must be a mechanism for preventing further "damage" to the state of an adapter. In order to do this, after the first load or store operation in error to the device, the hardware should prevent further load and store operations from reaching the I/O device.

Most I/O devices on most I/O buses are selected by address, and may have several address ranges to which they respond. In configuring a host bridge such as PCI host bridge 124 to prevent load and store operations from reaching an I/O device, typical approaches would involve either duplicating the decoding of I/O devices within the host bridge or shutting off all load and store operations to all devices under a particular host bridge. The former solution is not scalable, while the latter will kill many more I/O operations than would be desirable. For example, one PCI host bridge may provide connection to four or more I/O devices.

In the present invention, the problem of preventing loads and stores from completing after an error is solved for PCI-based systems by redesigning PCI host bridge 124. Individual device select (DEVSEL) lines 202*a*–202*n* from each I/O device 132 and 134 connected to PCI host bridge 124 are brought into PCI host bridge 124. This allows each device 132 and 134 to decode its respective address range and report to PCI host bridge 124 if it is selected. If an error is detected on a load or store operation to PCI bus 126 (such as a data parity error—PERR), the device for which the error occurred is logged in error register 204 via the individual device select lines 202*a*–202*n*. From this point until error register 204 within PCI host bridge 124 is cleared, valid data is never passed to the I/O device for which the previous error occurred on a store operation and the I/O device is never permitted to complete a valid read transaction on a load operation.

Once an error is detected on PCI bus 126 in the present invention, load and store operations to a device are not permitted to complete if the device is one which previously had an error—that is, if the DEVSEL read from device select lines 202*a*–202*n* matches the DEVSEL of the I/O adapter which had the error and was logged in error register 204. Since the DEVSEL signal comes several cycles into the bus operation, PCI host bridge 124 may delay operations to the I/O device until the DEVSEL signal is received.

Figure 3A:
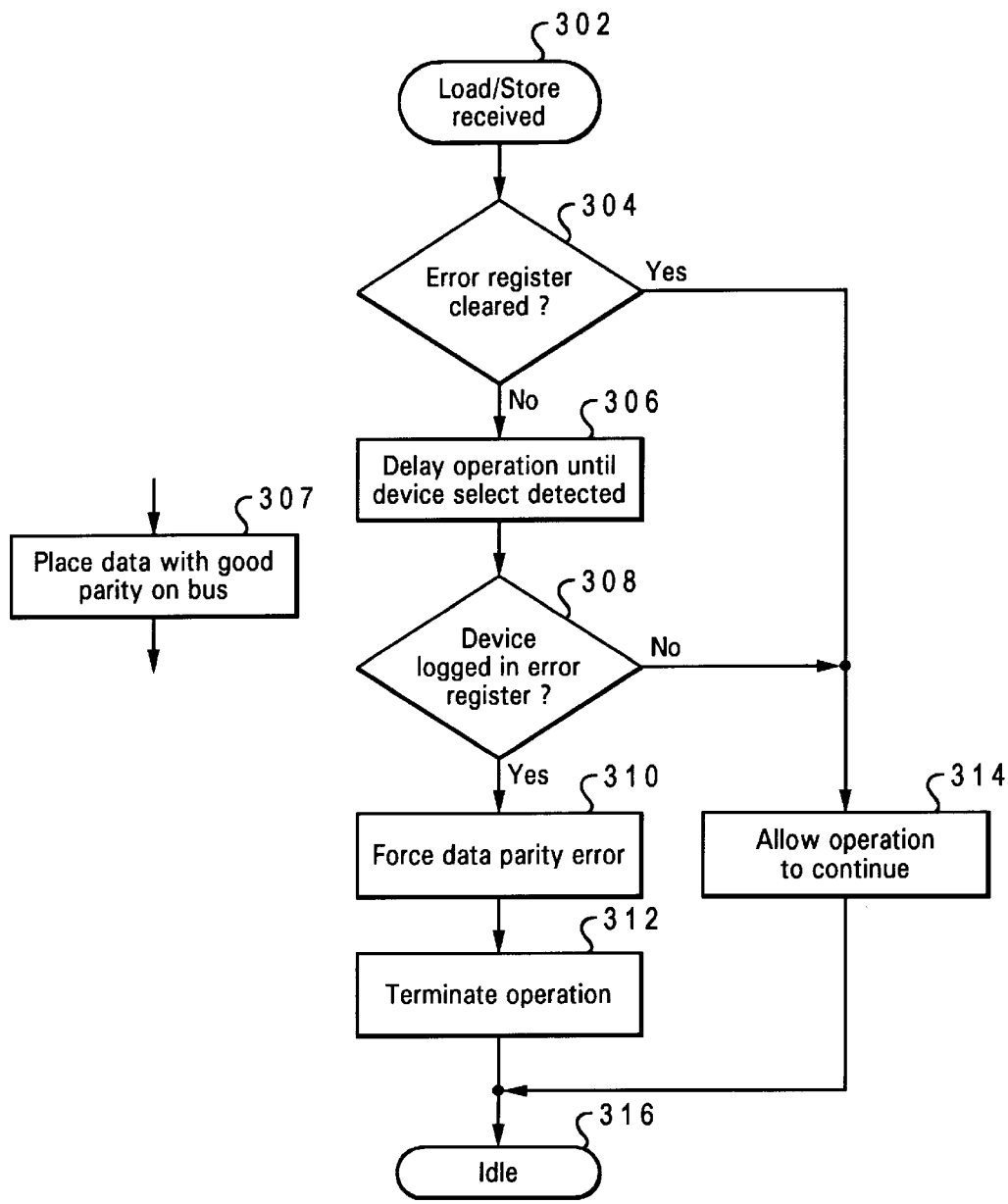
FIGS. 3A–3B depict high level flowcharts for processes of handling of load and store operations on a peripheral component interconnect bus after detection of an error in accordance with a preferred embodiment of the present invention.
Figure 3B:
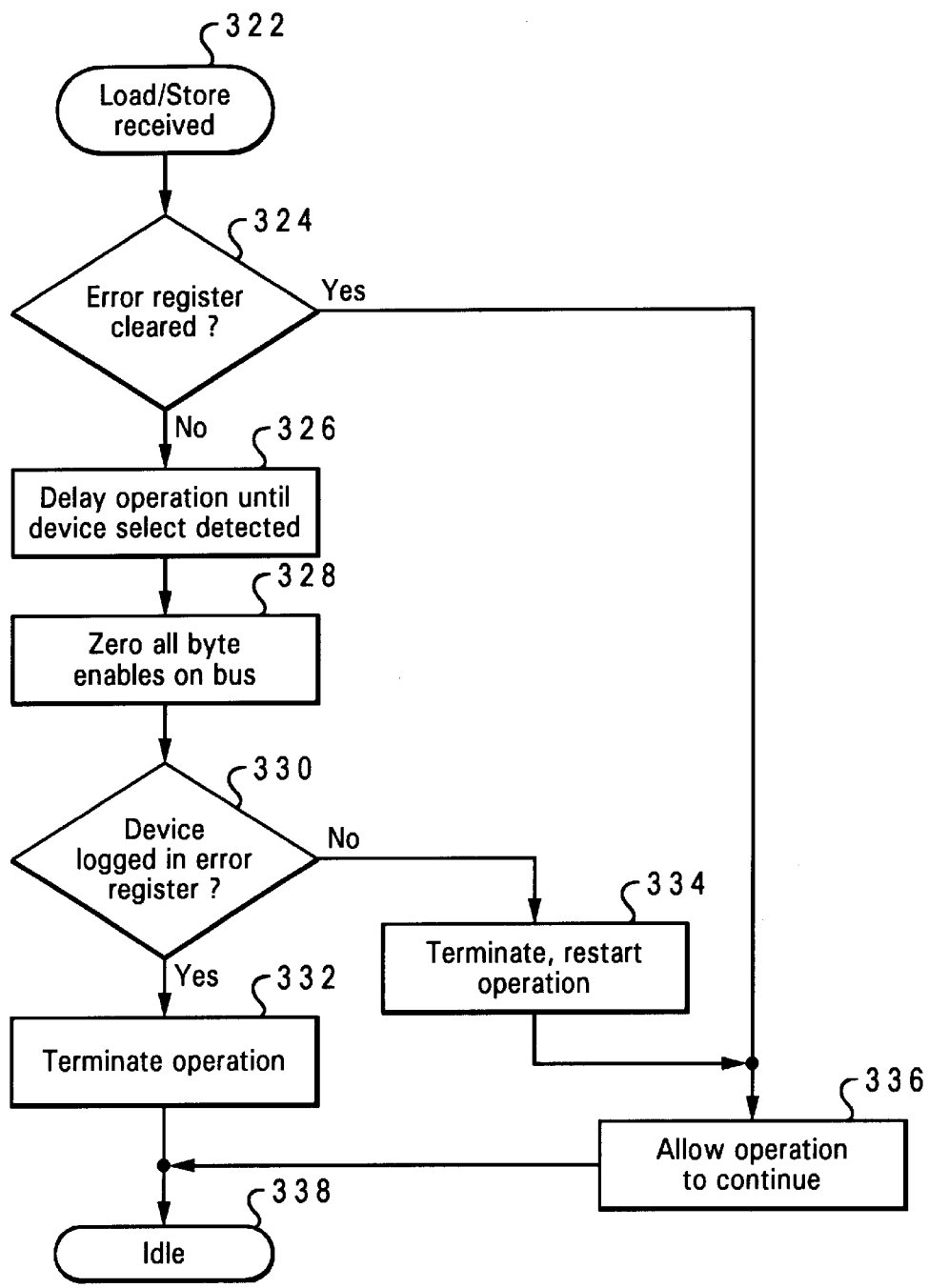

With reference now to FIGS. 3A and 3B, high level flowcharts for processes of handling of load and store operations on a peripheral component interconnect bus after detection of an error in accordance with a preferred embodiment of the present invention are depicted. In the present invention, devices for which an error occurs are logged by the device select associated with the device within an error register in the PCI host bridge. Further load and store operations to I/O device(s) identified in the error register are subsequently prevented from completing.

FIG. 3A depicts a process for a first method of preventing load/store operation from completing to a previously failing device in accordance with the invention. The process begins at step 302, which illustrates receiving a load or store operation for a device connected to a PCI bus. The process then passes to step 304, which illustrates determining whether the error register in the PCI host bridge is cleared. If not, the process proceeds to step 306, which depicts delaying completion of a read or write corresponding to the load or store until the device select lines may be read. This may be accomplished using the initiator ready (IRDY) signal line within the PCI bus. By not activating the initiator ready line, the read or write may be delayed until the device select indicator (also referred to herein as the device identifier or the device number) on the device select lines has been checked against the device number being held in the error register (that is, the device number captured from the previous error).

For store operations, the process may optionally proceed to step 307, which illustrates placing the data with good parity on the bus in preparation for transfer to the I/O device. This allows the store operation to proceed normally if the subject device is not a previously failing device logged in the error register. From step 307, if implemented, and otherwise from step 306, the process then passes to step 308, which illustrates a determination, once the device select indicator for the I/O device to which the load or store operation is directed becomes available, of whether the device select indicator is logged in the error register within the PCI host bridge.

If the device select indicator is logged in the error register, identifying a previously failing device, the process proceeds to step 310, which depicts forcing a data parity error on the operation. For store operations, this may be achieved by changing the parity on the bus to force a data parity error. For load operations, a signal may be transmitted to the PCI host bridge which will be interpreted as though there were bad parity. The PCI host bridge will then naturally signal a parity error (PERR) on the PCI bus to the I/O device, thus signalling the device not to produce any read side effects which would attend a good read operation.

The process then passes to step 312, which illustrates terminating the operation. This may be accomplished by activating the initiator ready signal and terminating the operation after one data transfer. Due to the bad data parity, the device should not use any bad data on a store operation or have any read side effects on a load operation. Thus, the operation is essentially a no-op. On a load operation, an error may be returned to the processor, which can detect the error and pin the error on the particular device driver performing the operation. The device driver may then clear the error register status in the PCI host bridge for that device to allow further operations to that device. The device driver should then perform appropriate clean-up and restart.

Referring again to step 308, if the device select indicator does not match any device number within the PCI host bridge error register, indicating that the device is not a previously failing device, then the process proceeds instead to step 314, which illustrates allowing the operation to continue. This may be accomplished by simply activating the initiator ready signal and permitting the operation to proceed. Load operations, which require the initiator ready signal to proceed in any event, may simply continue after the delay; store operations, if the data with good parity was (optionally) placed on the bus prior to delaying the operation, may also simply continue.

Referring back to step 304, if the error register is clear when the load/store operation is received, the process similarly proceeds instead to step 314, which illustrates allowing the operation to proceed normally. Note that the delay of a load/store operation to a "good" I/O device (one not logged in the error register) only occurs until the error register is reset. Therefore the method of the present invention has no performance impact on normal system operations, only during error recovery. From either of steps 314 or 312, the process passes to step 316, which illustrates the process becoming idle until another load or store operation is received.

FIG. 3B depicts a process for a second method of preventing load/store operation from completing to a previously failing device in accordance with the invention. The method of FIG. 3A involves permitting transfer of the data (or at least a single beat of the data, throwing the rest away) but forcing bad parity on the data. This method has a drawback in that the PCI architecture specification does not specify that a device should not use data with bad parity. A good design should not utilize data with bad parity, but doing so would not violate the PCI architecture specification. The alternative method depicted in FIG. 3B avoids this limitation by setting the byte enables for a data transfer to zero rather than forcing bad parity on the data. This has the advantage of being explicitly addressed in the PCI architecture specification, which states that the target of an access where no byte enables are asserted must complete the current data phase without any permanent change. The PCI architecture specification further indicates that: on a read transaction, this means that data or status are not changed; on a write transaction, the data is not stored.

The process depicted in FIG. 3B begins at step 322, which illustrates receiving a load or store operation for a device connected to a PCI bus. The process then passes to step 324, which illustrates determining whether the error register in the PCI host bridge is clear. If not, the process proceeds to step 326, which depicts delaying completion of a read or write corresponding to the load or store operation until the device select lines may be read, by not activating the initiator ready signal as in the first method.

From step 326, the method depicted in FIG. 3B varies from the previously described method in that the mechanism employed to prevent completion of load/store operations is actuated before the device number has been checked against the error register. Thus, the process passes to step 328, which illustrates placing all zero byte enables (BEs) on the bus (that is, all inactive). This will indicate to the I/O device not to pull any data off the bus on a store operation and not to have any side effects from the resulting read on a load operation.

The process next passes to step 330, which depicts a determination of whether the device number on the device select lines is contained within the error register on the PCI host bridge, indicating that the device is a previously failing device. If so, the process proceeds to step 332, which illustrates activating the initiator ready signal and terminating the cycle as described above. The bus operation is thus essentially a no-op. As previously described, an error may be returned to the processor to allow the operating system and device driver to clear the PCI host bridge error register and clean up and restart, respectively.

If the device number matches the device identifier logged in the error register, the process proceeds instead to step 334, which depicts terminating and restarting the operation. This may be accomplished by activating the initiator ready signal and allowing the operation to continue (a no-op again), then restarting the operation with the first address and valid byte enables. The process next passes to step 336, which illustrates allowing the process to continue normally. As with the previous method, the process also passes to step 336 from step 324 if the error register is clear when the load/store operation is received, so that system performance during normal operations is not affected and operations are only delayed during error recovery. From either of steps 332 or 336, the process passes to step 338, which illustrates the process becoming idle until another load/store operation is received.

The two alternative methods depicted in FIGS. 3A and 3B both have advantages and limitations. Forcing bad parity on the data allows operations to devices not logged in the error register to proceed without unnecessary delay, but does not ensure that bad data will not be utilized. Zeroing the byte enables prevents bad data from being employed, but requires operations to "good" devices (those not logged in the error register) to be terminated and restarted. The best method may thus depend on the particular circumstances under which the present invention is being implemented.

In addition to preventing load and store operations to previously failing devices from completing, the PCI host bridge should also prevent direct memory access (DMA) from the failing device. To do that, the PCI host bridge may associate an arbitration level with the device select lines and prevent the failing device from ever receiving a bus grant (GNT) signal.

The technique of preventing damage to a previously failing I/O device described above may be employed not only for parity errors, but also for any other errors seen on the PCI bus during load or store operations which may be pinned to a particular device, such as a target abort from the target device. Additionally, if an error is received which cannot be pinned to a particular device (such as an address parity error), then the error register may be set to indicate that all I/O devices under that PCI host bridge have had an error, and all subsequent load or store operations to those devices will be flagged as in error.

In addition to errors seen on the PCI bus, the technique of preventing damage to a device may be utilized for errors on the bus on the other side of the PCI host bridge. As long as the error may be pinned to a particular PCI device, the methods of the present invention will provide a more workable solution. For example, if a parity error is seen on a store operation to a PCI device, the PCI host bridge may pass that bad parity on to the PCI bus. When the device thereafter responds with a device select, it will also respond with a parity error (PERR) signal. The methods described above will then take effect.

The present invention prevents completion of load and store operations to a previously failing device without requiring any changes to PCI adapter hardware and without requiring a substantial amount of processor time. The method of the present invention only delays load/store operations if a device has failed and error recovery has not yet completed (if the error register has not yet been reset), and does not impact performance during normal system operations. The method of the present invention also isolates previously failing devices and allows load and store operations to remaining devices to proceed, even if the target device is under the same PCI host bridge as the previously failing device.

While the invention has been particularly shown and described with reference to a preferred embodiment, it will be understood by those skilled in the art that various changes in form and detail may be made therein without departing from the spirit and scope of the invention.

What is claimed is:

1. A method of preventing load or store operations to a previously failing device from completing, comprising:
    responsive to receiving a load or store operation, checking a status of an error register;
    responsive to determining that the error register has not been reset, delaying the load or store operation until a device identifier for a target device for the load or store operation may be checked against the error register; and
    responsive to determining that the device identifier for the target device of the load or store operation is logged within the error register, preventing the load or store operation from completing.

2. The method of claim 1, wherein the step of checking a status of an error register further comprises:
    checking a status of an error register within a host bridge.

3. The method of claim 1, wherein the step of delaying the load or store operation until a device identifier for a target device for the load or store operation may be checked against the error register further comprises:
    delaying a read or write corresponding to the load or store operation until the device identifier becomes available on device select lines connected to a host bridge.

4. The method of claim 1, wherein the step of delaying the load or store operation until a device identifier for a target device for the load or store operation may be checked against the error register further comprises:
    not activating an initiator ready signal.

5. The method of claim 1, wherein the step of preventing the load or store operation from completing further comprises:
    forcing bad parity on the load or store operation.

6. The method of claim 5, wherein the step of forcing bad parity on the load or store operation further comprises:
    changing a parity of data on a bus for a store operation.

7. The method of claim 5, wherein the step of forcing bad parity on the load or store operation further comprises:
    signalling a parity error to a device on a load operation.

8. The method of claim 5, further comprising:
    terminating a data transfer for the load or store operation after transferring a single beat of data.

9. The method of claim 1, wherein the step of preventing the load or store operation from completing further comprises:
    placing all zero byte enables for the load or store operation on a bus.

10. The method of claim 9, further comprising:
    terminating and restarting the load or store operation.

11. The method of claim 1, further comprising:
    upon detecting an error on a bus, logging a device identifier based on device select lines when the error occurred in the error register.

12. The method of claim 1, further comprising:
    responsive to determining that the error register has been reset, allowing the load or store operation to proceed.

13. A method of preventing load or store operations to a previously failing device from completing while allowing load or store operations to other devices to proceed, comprising:
    responsive to receiving a load or store operation, checking a status of an error register within a host bridge coupled to a plurality of devices;
    responsive to determining that the error register has not been reset, delaying the load or store operation until a device identifier for a target device for the load or store operation may be checked against a device identifier for any previously failed device logged within the error register; and
    responsive to determining that the device identifier for the target device of the load or store operation is logged within the error register, preventing the load or store operation from completing; and
    responsive to determining that the device identifier for the target device of the load or store operation is not logged within the error register, allowing the load or store operation to proceed.

14. The method of claim 13, wherein the step of allowing the load or store operation to proceed further comprises:
    not changing a parity of data on a bus for a store operation; and activating an initiator ready signal.

15. A mechanism for preventing load or store operations to a previously failing device from completing, comprising:

a host bridge connecting a bus to a remainder of a data processing system;

device select lines connected to the host bridge; and an error register logging a device identifier on the device select lines when an error is detected on the bus, wherein the host bridge includes:

means, responsive to receiving a load or store operation, for checking a status of an error register;

means, responsive to determining that the error register has not been reset, for delaying the load or store operation until a device identifier for a target device for the load or store operation may be checked against the error register; and means, responsive to determining that the device identifier for the target device of the load or store operation is logged within the error register, for preventing the load or store operation from completing.

16. The mechanism of claim 15, wherein the error register is contained within the host bridge.

17. The mechanism of claim 15, wherein the means for delaying the load or store operation until a device identifier for a target device for the load or store operation may be checked against the error register further comprises:

means for delaying a read or write corresponding to the load or store operation until the device identifier becomes available on the device select lines.

18. The mechanism of claim 15, wherein the means for delaying the load or store operation until a device identifier for a target device for the load or store operation may be checked against the error register further comprises:

means for not activating an initiator ready signal.

19. The mechanism of claim 15, wherein the means for preventing the load or store operation from completing further comprises:

means for forcing bad parity on the load or store operation.

20. The mechanism of claim 19, wherein the means for forcing bad parity on the load or store operation further comprises:

means for changing a parity of data on the bus for a store operation.

21. The mechanism of claim 19, wherein the means for forcing bad parity on the load or store operation further comprises:

means for signalling a parity error to a device on a load operation.

22. The mechanism of claim 19, further comprising:

means for terminating a data transfer for the load or store operation after transferring a single beat of data.

23. The mechanism of claim 15, wherein the means for preventing the load or store operation from completing further comprises:

means for placing all zero byte enables for the load or store operation on the bus.

24. The mechanism of claim 23, further comprising:

means for terminating and restarting the load or store operation.

25. The mechanism of claim 15, further comprising:

means, responsive to detecting an error on the bus, for logging a device identifier on the device select lines when the error occurred in the error register.

26. The mechanism of claim 15, further comprising:

means, responsive to determining that the device identifier for the target device of the load or store operation is not logged within the error register, for allowing the load or store operation to proceed.

27. The mechanism of claim 26, wherein the means for allowing the load or store operation to proceed further comprises:

means for not changing a parity of data on the bus for a store operation; and means for activating an initiator ready signal.

28. The mechanism of claim 15, further comprising:

means, responsive to determining that the error register has been reset, for allowing the load or store operation to proceed.

* * * * *